(No Model.)
W. MORGAN.
HARNESS SUPPORT.
No. 494,532. Patented Mar. 28, 1893.
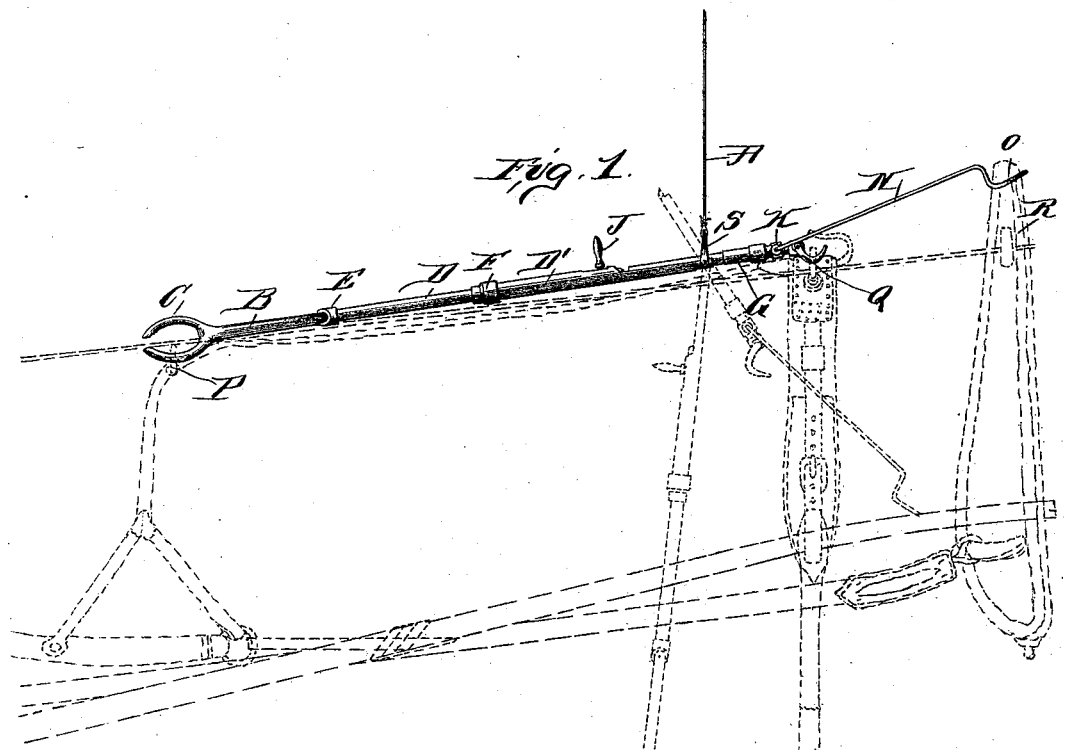
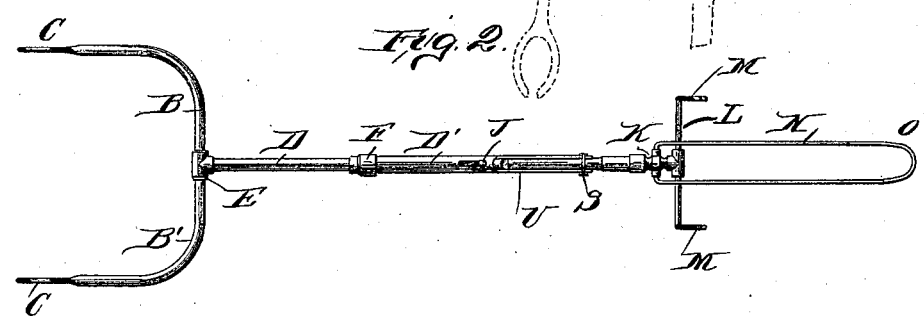
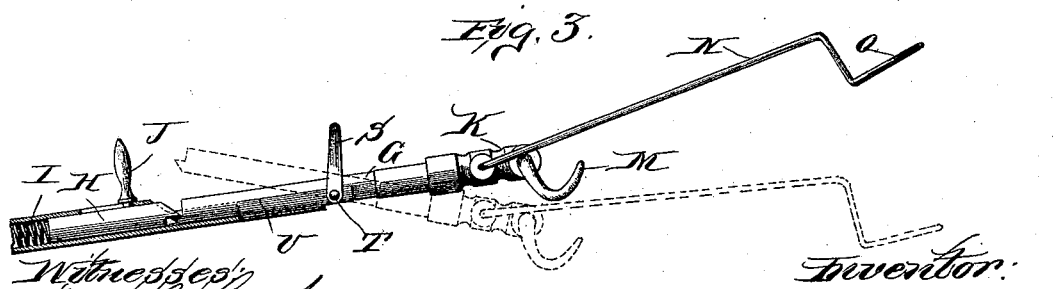

UNITED STATES PATENT OFFICE.

WILLIAM MORGAN, OF ST. LOUIS, MISSOURI, ASSIGNOR OF ONE-FIFTH TO JAMES L. HOPKINS, OF SAME PLACE.

HARNESS-SUPPORT.

SPECIFICATION forming part of Letters Patent No. 494,532, dated March 28, 1893.

Application filed September 2, 1892. Serial No. 444,915. (No model.)

*To all whom it may concern:*

Be it known that I, WILLIAM MORGAN, a citizen of the United States, residing at the city of St. Louis, in the State of Missouri, have invented a new and useful Harness Frame or Holder, of which the following is a specification.

My invention relates to a jointed frame upon which harness can be stretched and held suspended: and the objects of my invention are, first, to provide a jointed, folding frame upon which a harness can be held and hung, extended: second, to provide for the withdrawal of the frame, after said frame and the harness hung thereon, have been lowered so that the harness rests upon the horse. These objects I obtain by the mechanism illustrated in the accompanying drawings, in which Figure 1. is a horizontal view of the entire machine; Fig. 2, a top view of the machine; Fig. 3, a horizontal section of the portion of the machine intended to hold the forward portion of the harness.

Similar letters refer to similar parts throughout the several views.

My invention consists of a hanging frame or holder for single buggy harness: said frame being held in suspension at an elevated position by means of a pulley, cord and weight attached to the frame at the loop S. The frame itself consists of a jointed, hollow shaft, or tube D, connecting with a fork B by means of the T-joint E: said shaft being in two parts, the reducing joint F connecting them. A hinged bar G fits into the larger end of the shaft D, working vertically on a pin T, which pin also holds the loop S. The fork upon which the rear part of the harness is suspended, is made up of two arms B, B' which are screwed into the T-joint E and are each provided with a double or oval-shaped prong or hook C. The shaft D is cut open at U forming a shell to receive the bar G. The bar G is held in place by the spring bolt H, the bolt H being held in position by the coiled spring I (seen only in Fig. 3) inside the shaft D. Said spring I terminates at the reducing joint F. The bolt H is released by pressure on the handle knob J. The bar G terminates in a double T-joint K, at the end of which is affixed at right angles the bar L. The bar L has the prong M at either end. Behind the bar L on the T-joint K is hinged the wire loop N the loop N forming the hook O at its extremity.

When in position the harness is held as seen in Fig. 1: the hip straps being held by the prongs C, the rings on each side of the saddle being held by prongs M, and the mule collar being hung on prong O. In placing the harness on the horse the frame is lowered and when the harness rests on the horse the knob J is pressed, releasing the bar G which drops, releasing the harness and the frame is pulled up from the back of the horse by the pulley and weight.

I am aware that prior to my invention machines for the holding of harness in suspension have been made. I do not claim broadly a patent on harness frames for the purpose named. But What I do claim as my invention, and desire to secure by Letters Patent, is—

1. A harness suspending frame comprising a tubular main portion consisting of two members having devices at the ends for suspending the harness, one of the members being at its end cut away to form a shell-like bearing for embracing the end of the other member which is pivoted thereto and a bolt for holding the other member of the frame in line therewith, substantially as described.

2. A harness suspending frame comprising a main portion made up of two members jointed together whereby the frame is adapted to fold or bend between its ends, means for holding the two parts of the frame rigidly in line with each other, one of the members of the frame being provided with means for suspending the rear part of the harness, and the other member being provided with the cross bar L having the hook for the saddle, and with the loop N extending in front of the cross bar and adapted to support the collar, substantially as described.

3. A harness suspending frame composed of two members hinged together whereby the frame is adapted to bend between its ends, means for holding the two parts of the frame rigidly in line with each other, one of the parts or members of the frame being provided with means for suspending the front end
5 of the harness, and the other member being provided with a T-joint and with the fork made up of two arms B, B' which are screwed into the T-joint and are provided at their ends with the oval-shaped or double hooks C, C, substantially as described.

WILLIAM MORGAN.

Witnesses:
ARTHUR L. REED,
FURMAN L. CUMMINGS.